United States Patent [19]

Mukae et al.

[11] Patent Number: 4,740,853
[45] Date of Patent: Apr. 26, 1988

[54] MAGNETIC CORE WITH OXIDE FILM

[75] Inventors: Hideaki Mukae, Kobe; Takafumi Kori, Yunotani, both of Japan

[73] Assignee: Alps Electric Co., Ltd., Japan

[21] Appl. No.: 870,626

[22] Filed: Jun. 4, 1986

[30] Foreign Application Priority Data

Jun. 4, 1985 [JP] Japan .................................. 60-120844

[51] Int. Cl.⁴ .............................................. G11B 5/23
[52] U.S. Cl. .................................... 360/103; 360/120
[58] Field of Search ................ 360/103, 102, 120, 122

[56] References Cited

U.S. PATENT DOCUMENTS 3,922,776 12/1975 Alger et al. ..................... 360/103 X
4,298,899 11/1981 Argumedo et al. ............. 360/103 X
4,361,860 11/1982 Nozawa ............................. 360/120

FOREIGN PATENT DOCUMENTS 56-163521 12/1981 Japan .................................. 360/120

Primary Examiner—John H. Wolff
Attorney, Agent, or Firm—Guy W. Shoup

[57] ABSTRACT

A floating magnetic head including a slider and a recording and reproducing core fixed to the slider by glass. The core is formed from a magnetic alloy of iron, aluminum and silicon, and has an oxide film formed on each surface thereof contacting the glass.

2 Claims, 2 Drawing Sheets

MAGNETIC CORE WITH OXIDE FILM

BACKGROUND OF THE INVENTION

1. Field of the Invention

This invention relates to a floating magnetic head, and more particularly, to a floating magnetic head which is suitable for storing digital signals in a hard disk and reproducing them.

2. DESCRIPTION OF THE PRIOR ART

There is known a floating magnetic head which is positioned at a height of, say, 0.2 to 0.5 micron above the surface of a hard disk for storing digital signals therein or reproducing them. In the known floating magnetic head, glass is used for fixing a recording and reproducing core to a slider, and the core is formed from a ferrite which can form a strong bond with the glass. The ferrite is also resistant to the wear which is caused by a magnetic recording medium.

While it has been usual to form a magnetic film of —$Fe_2O_3$ on a magnetic recording medium, a metallic material having a higher degree of magnetic resistance has recently come to be used to form such a magnetic film, as it enables the production of a magnetic recording medium showing good reproducing output characteristics in a high frequency range. These good characteristics are, however, not fully available, if a recording and reproducing core formed from a ferrite is employed, since its saturation magnetic flux density is not sufficiently high.

SUMMARY OF THE INVENTION

It is an object of this invention to provide a floating magnetic head which can fully derive the characteristics of a magnetic recording medium made by using a metallic material having a high degree of magnetic resistance.

This object is attained by a floating magnetic head comprising a recording and reproducing core formed from a magnetic alloy of iron, aluminum and silicon and having an oxide film formed on its surface contacting the material which is used to fix the core to a slider.

The core has a higher saturation magnetic flux density than the conventional ferrite core, and thereby enables the head to produce a high output of reproduction in a high frequency range. The oxide film forms a very strong bond between the core and the slider. The oxide film also renders the core comparable to the ferrite core in resistance to the wear which is caused by a magnetic recording medium.

DETAILED DESCRIPTION OF THE INVENTION

Figure 1:
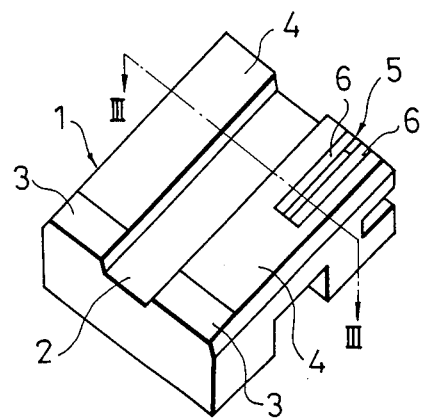
FIG. 1 is a perspective view of a floating magnetic head embodying this invention.

A floating magnetic head is shown at 1 in FIG. 1. It includes a generally planar slider 2 formed from, for example, a ceramic material, a non-magnetic ferrite, or a composite material prepared from a metal and carbon. The slider 2 is formed at its top with a pair of transversely spaced apart slider shoes 4 each having a slanting surface 3 at one end thereof. A recording and reproducing core 5 is fixed to at least one of the slider shoes 4 by glass as shown at 6.

Figure 2:
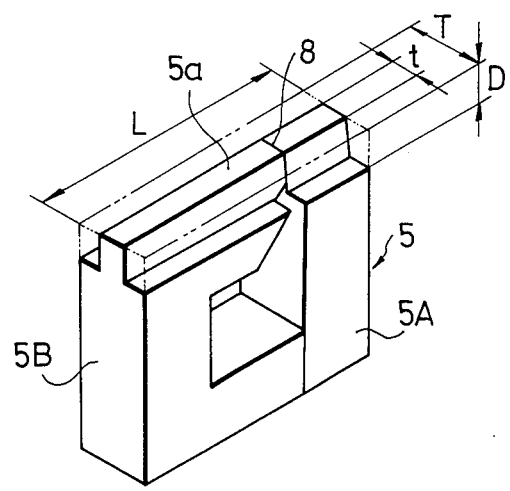
FIG. 2 is an enlarged perspective view of the recording and reproducing core in the magnetic head of FIG. 1.
Figure 3:
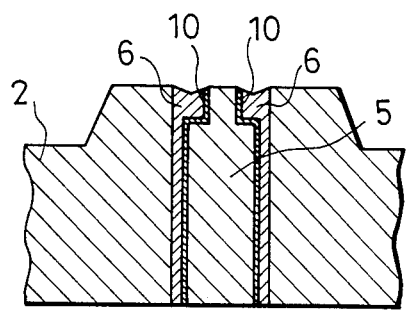
FIG. 3 is an enlarged sectional view taken along the line III—III of FIG. 1.

The core 5 comprises two core portions 5A and 5B joined to each other, as shown in FIG. 2. The core 5 has a longitudinally centrally extending top portion 5a having a thibkness t which is smaller than the thickness T of its remainder, a length L which is equal to that of its remainder, and a height which is shown at D. The thickness t of the top portion 5a defines a track width. Therefore, the head gives a magnetic recording medium an increased storing capacity.

The core 5 is formed from a magnetic alloy of iron, aluminum and silicon. It has an oxide film 10 formed on each of its lateral surfaces contacting the glass 6 which fixes the core 5 to the slider 2.

The oxide film 10 is provided for achieving a bond of improved strength between the core 5 and the glass 6. It can be formed as will hereinafter be described by way of example. The two core portions 5A and 5B are, first, oxidized on the entire surfaces thereof. This oxidation may be done by heating, or employing a plasma, or chemically.

When heating is employed, the core portions 5A and 5B are heated at a temperature which is higher than, say, 750° C. and lower than the recrystallization temperature of the alloy from which they are formed, for 10 to 30 hours in the air, or a gas having a limited oxygen content. The heating of the core portions 5A and 5B has the advantage of making it possible to anneal them to remove the strain which has been produced therein during their manufacture, and thereby improve their magnetic properties.

If a plasma is employed, it is radiated on the surfaces of the core portions 5A and 5B to oxidize them. It is preferable to use a high power in the range of, say, 800 to 2000 W to remove impurities from the grain boundary in the alloy.

The oxide film 10 preferably has a thickness of, say, 0.1 to 1 micron, whichever method may be employed for forming it.

The oxidizing treatment roughens the surfaces of the core portions 5A and 5B. The grain boundaries in the alloy are particularly heavily oxidized, and the impurities are, therefore, removed therefrom. The removal of the impurities prevents the generation of bubbles by the grain boundaries which has hitherto made difficult the glass bonding of a polycrystalline metal.

Then, the oxide film 10 is removed partly from each of the core portions 5A and 5B, i.e., from its surface at which it is joined to the other core portion, and its top and bottom surfaces, by a customary method. A coil is wound on each core portion, and the core portions 5A and 5B are joined together to leave a magnetic gap 8 therebetween, whereupon the core 5 is assembled. Although each core portion has been described as being oxidized on its entire surface, it is alternatively possible to mask its portions on which no oxide film is desired, so that no trouble of partial oxide removal may be required.

Then, the core 5 is fitted in the slider 2 and the molten glass is poured into the clearances between the slider 2 and the core 5. The glass 6 and the oxide films 10 undergo mutual diffusion to form a strong bond therebetween. The glass 6 penetrates by a capillary action into the oxidized and roughened surfaces of the core 5 and particularly the grain boundaries. The glass 6, thus, produces a wedge action and thereby bonds the core 5 to the slider 2 very strongly. This feature is particularly important in view of the fact that the alloy from which the core 5 is formed may have a relatively low bonding strength when glass is used as a bonding material.

Although the oxide films 10 have been described as being formed on the whole surfaces of the core 5 facing the slider 2, it is alternatively possible to form the oxide films only on limited portions of those surfaces. The oxide films 10 can, of course, be formed by any method other than those which have hereinbefore been mentioned specifically.

What is claimed is:

1. A floating magnetic head in a slider assembly which is to be used to provide the magnetic head in floating contact with the surface of a magnetic medium, comprising:

two core portions made of a magnetic alloy of Fe-Al-Si joined in contact together on respective joining sides thereof;

a coating of an oxide film formed over substantially all of the peripheral surfaces of both core portions; wherein portions of the oxide films are removed on the respective joining sides where the two core portions are joined in contact together;

the two core portions being joined together such that respective contact sides thereof which are placed in contact with a magnetic medium are aligned with each other and separated by a recording and reproducing gap;

the two core portions being disposed in between a pair of transversely spaced apart slider shoes of the slider assembly which have side walls perpendicular to the surface of the magnetic medium, the side walls being spaced from corresponding outer sides of the two core portions by given clearances; and the core portions being bonded by molten glass as a bonding material poured by capillary action into the clearances between the core portions and slider shoes, wherein the glass forms a tight bond by penetrating the oxide film surfaces on the outer sides of the core portions in said clearances.

2. A floating magnetic head as set forth in claim 1, wherein said oxide film is formed by a method selected from heating, plasma radiation and chemical reaction.

* * * * *